OR  3,985,419

United States Patent [19]
Matsumoto et al.

[11] 3,985,419
[45] Oct. 12, 1976

[54] METHOD OF MAKING A SYNTHETIC FOCUSED IMAGE HOLOGRAM

[75] Inventors: Kazuya Matsumoto, Yokohama; Akio Yano, Kawasaki, both of Japan

[73] Assignee: Canon Kabushiki Kaisha, Tokyo, Japan

[22] Filed: May 8, 1974

[21] Appl. No.: 468,291

Related U.S. Application Data

[63] Continuation of Ser. No. 393,882, Sept. 4, 1973, abandoned, which is a continuation of Ser. No. 186,602, Oct. 5, 1971, abandoned.

[30] Foreign Application Priority Data
Oct. 5, 1970  Japan.................. 45-87358
Nov. 13, 1970  Japan.............. 45-100515

[52] U.S. Cl............................. 350/3.5; 350/170
[51] Int. Cl.²............................ G03H 1/28
[58] Field of Search................ 350/3.5, 170

[56] References Cited
UNITED STATES PATENTS
1,696,431  12/1928  Crockett............................ 350/204
3,608,993   9/1971  De Bitetto.......................... 350/3.5

OTHER PUBLICATIONS
Klimenko et al., *Optics and Spectroscopy*, vol. 26, No. 6, June 1969, pp. 552–555.

*Primary Examiner*—Ronald J. Stern
*Attorney, Agent, or Firm*—Toren, McGeady and Stanger

[57] ABSTRACT

A method of making a synthetic focused image hologram consisting of:
a step to diffusely illuminate plural number of component pictures having different image informations with coherent beam, a step to image by an imaging optical system the images of the plural number of component pictures having different image informations on a hologram recording medium,
a step to irradiate a coherent reference beam on a hologram recording medium, and
a step to have the beam from the component pictures and the reference beam interfere with each other and to record the interference fringes generated by said interference on the recording medium.

7 Claims, 11 Drawing Figures

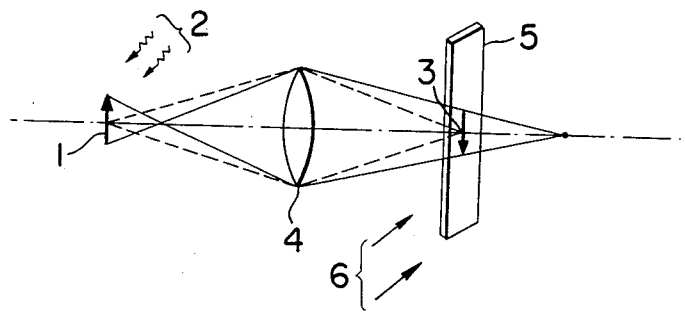
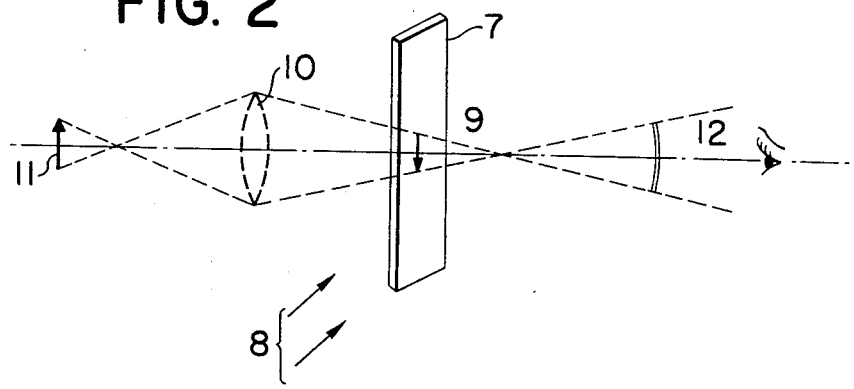
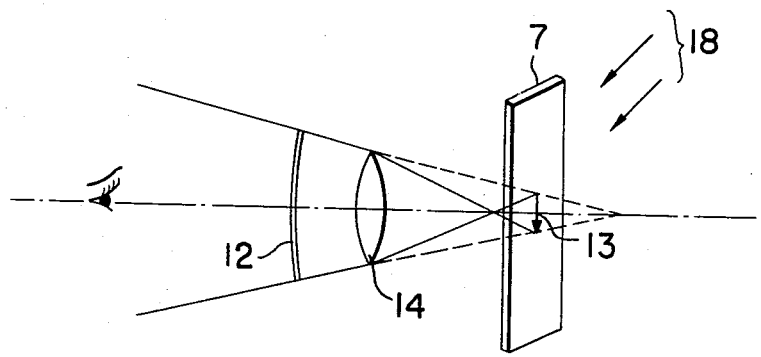

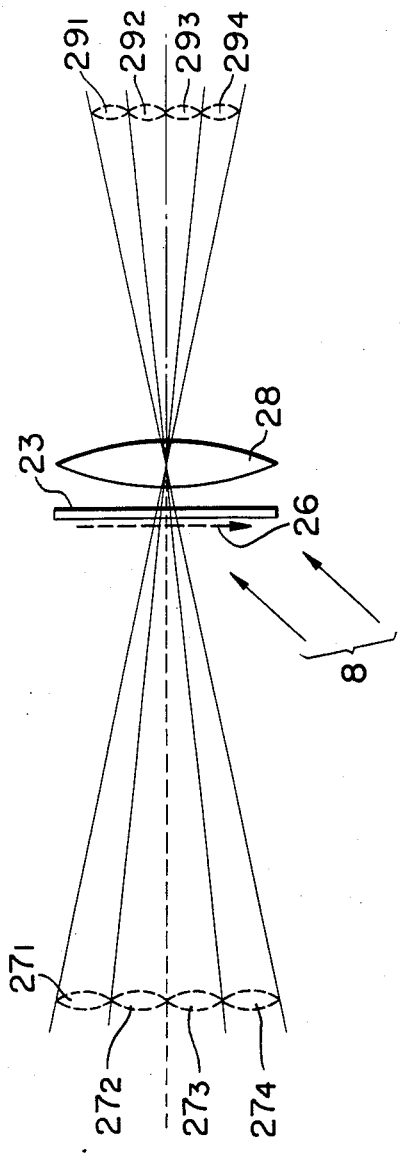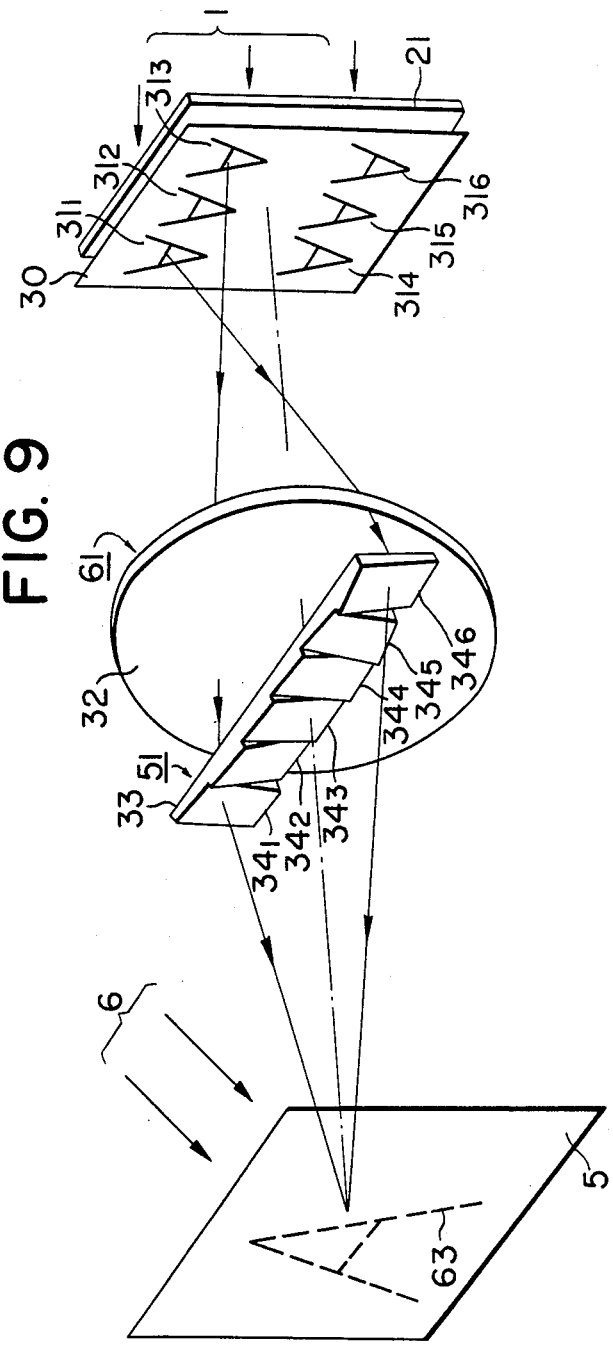

METHOD OF MAKING A SYNTHETIC FOCUSED IMAGE HOLOGRAM

This is a continuation of application Ser. No. 393,882 filed Sept. 4, 1973, which, in turn, is a continuation application of Ser. No. 186,602 filed Oct. 5, 1971. Applications Ser. Nos. 393,882, and 186,602, have been abandoned.

The present invention relates to an improved method of making a focused image hologram. A conventional focused image hologram is obtained by illuminating a diffusing object with a laser beam, or other coherent light, imaging the wave front from the diffusing object using an imaging optical system, and by having a reference beam at its imaging plane or its vicinity, then by recording the interference fringe on a recording medium.

For reconstructing such an image hologram, the hologram is irradiated with a reconstruction wave front, that is the same reference wave front used at the time of recording or with a wave front conjugate with respect to the reference beam. The reconstructed real or virtual image can be observed at the plane of hologram or at its vicinity and viewing angle of the image is limited to a given angle that is hereinafter described by the term "an effective viewing window". The effective viewing window of the reconstructed image will be refined by the effective pupil of the imaging optical system.

Such a focused image hologram is especially useful when a colored reconstructed image is to be obtained. That is, from this image hologram, an image is reconstructed on a hologram plane or at its vicinity, even with the reconstruction wave front consisted of quasi-mono-chromatic light, without any colour smearing at the object edges. Thus it does not require monochromatic light source such as laser beam. Even when a hologram is made with three laser beams of different colours, reconstruction is possible with a quasi-mono-chromatic light taken out with a filter from the light emitted from a conventional light source.

The synthetic focused image hologram is a hologram made with component pictures having different parallax information, which pictures were taken of an object illuminated by natural light and by ordinary photographic means. Therefore, it is advantageous to use the synthetic focused image hologram when the object to be recorded is large and does not allow coherent illumination, for example when scenary is to be recorded.

With conventional methods, synthetic focused image holograms are made by illuminating non-diffusing component pictures with non-diffuse beam. Therefore, at the reconstruction of the hologram, an image of plural of an imaging optical system is not formed, and we cannot have the effective viewing window; that means we can not see the reconstructed image directly. Thus it has been necessary to observe the reconstructed image at distance sufficiently long that the entire reconstructed image or entire hologram can be observed, or to use field lens at short observation distance as described in an article on the journal "Nature" vol. 220 p. 58 (1968) written by J. D. Redman and W. P. Wolton.

One object of the present invention is to provide a novel method for making focused holograms without the above mentioned shortcomings.

Another object of the present invention is to provide a method of making a synthetic focused image hologram by illuminating a plural number of component pictures having different image information with diffuse light.

Further another object of the present invention is to provide a method for making a synthetic focused hologram, wherein a component picture, in which different image information are arranged independently under a predetermined rule, is illuminated with diffuse light beam, then each one of image informations will be rearranged with an optical instrument, and the informations are overlapped on a hologram recording medium.

FIG. 1 shows a conventional method of making an image hologram by irradiating a non-diffuse beam onto a diffusing object.

FIG. 2 is a diagram showing a method of reconstructing the hologram prepared by the method of FIG. 1, using same wave front as the reference wave front at the time of preparing a hologram.

FIG. 3 shows a method of reconstructing the hologram prepared as in FIG. 1, using a wave front conjugate with respect to the reference wave front used at the time when a hologram is made.

FIG. 8 shows a method of reconstruction with the same wave front as the reference wave front used for making the hologram.

FIG. 9 shows a method of preparing a synthetic focused image hologram from one component picture in which each of different image information is independently arranged.

Figure 4:
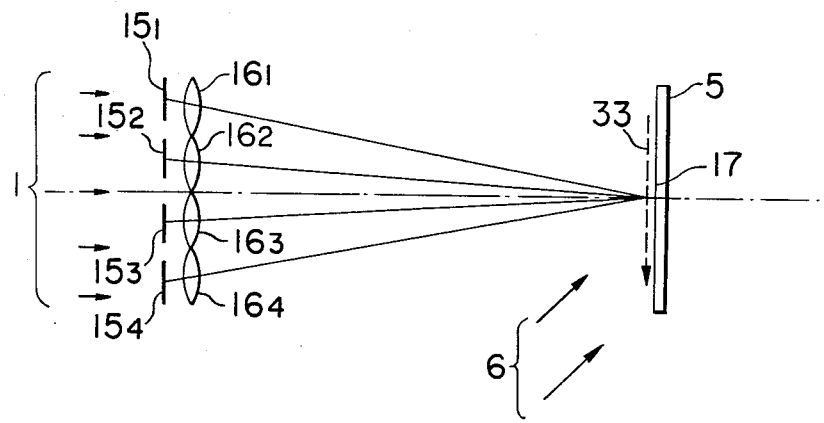
FIG. 4 is a diagram showing a conventional method of making a synthetic focused image hologram by illuminating the component picture with non-diffuse light.

In FIG. 1 which shows the conventional method of preparing a hologram, a diffusing object 1 is illuminated with a coherent beam 2 such as a laser beam. Then an image 3 of the the object 1 is formed by an imaging optical system 4 on the plane of a recording medium 5 or at its vicinity. The image on the recording medium 5 is recorded with a coherent reference beam 6.

The recording medium, on which the interference fringe of the wave front from the object and the wave front of the reference beam meet as mentioned above, is fixed by suitable means such as photographic development, to form a hologram 7. There are two methods of reconstructing the image 3 of the object 1 from this hologram 7. The first method is to irradiate the hologram with the same wave front as the reference wave front used in making the hologram. The second method is to irradiate a wave front that is conjugate with respect to the reference wave front. FIG. 2 shows the first method. Here a reconstruction beam 8 with a wave front the same as that of the reference beam is irradiated on the hologram 7. This forms a reconstructed virtual image 9 on the hologram plane or its vicinity and is a reconstructed virtual image 10 of the pupil of an imaging optical system. An arrow 11 shows the size and the position of the original object 1. The reconstructed image 12 of the pupil of the imaging optical system is the effective viewing window through which we can observe the reconstructed image 3 of the object.

FIG. 3 illustrates the case when the reconstruction beam 8 of the wave front conjugate with the wave front of the reference beam is irradiated on the hologram 7. This produces a reconstructed real image 13 and a real image 14 of the pupil of the imaging optical system 4.

Since in the above mentioned method for making an image hologram, the illuminating beam 2 is diffused by the object 1, the beam coming from any point of the object 1 is applied to entire pupil of the imaging optical system 4, and is imaged and recorded on the recording medium.

Therefore the entire information of the reconstructed image of an object is contained in a point of the reconstructed image of the pupil of an imaging optical system 4. The whole reconstructed image can be observed at the position within the images 10 and 14 of the pupil of the image of the imaging optical system 4.

However, when a focused image hologram is synthesized from component pictures without diffuse illumination, the hologram can not reconstruct the image of the pupil of the imaging optical system, and therefore effective viewing window is not formed.

This will be explained with reference to FIG. 4 or FIG. 5.

In FIG. 4, a coherent beam, 1 strikes respective component pictures $15_1$ to $15_4$ having different image information, for example parallax information. A number of imaging optical systems $16_1$ to $16_4$ are positioned in front of respective component pictures $15_1$ to $15_4$ and form component pictures of which picture 17 is one. When the component pictures $15_1$ to $15_4$ are illuminated by the coherent beam 1, the imaging optical system $16_1$ to $16_4$ make this images $15_1$ to $15_4$. Each image overlaps on the plane of the recording medium 5 or at its vicinity. The interference fringes made with the above image forming beam and the reference beam 6 are recorded on the recording medium 5. Thus a focused image hologram 18 is obtained.

Figure 5:
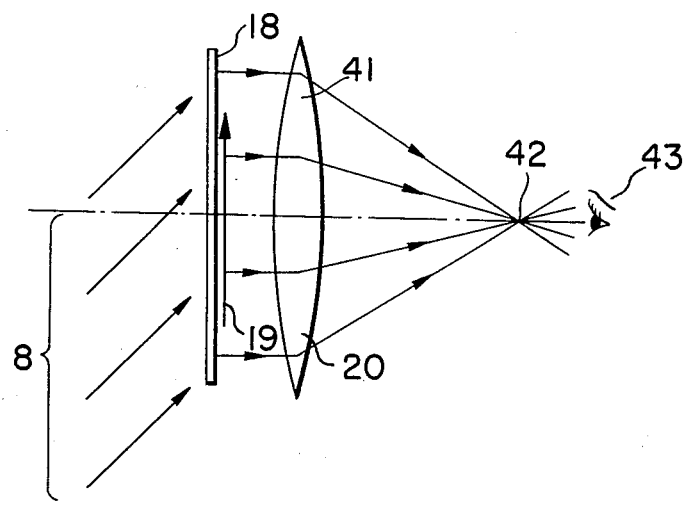
FIG. 5 is a diagram showing a method of reconstructing a synthetic focused image hologram prepared by the method of FIG. 4.

The method of reconstructing said focused hologram 18 is shown in FIG. 5. When the focused image hologram 18 is illuminated with a reconstructing beam 8, a reconstructed image 19 is obtained. However, since the hologram is made without a diffuse illumination, the image of the pupil of the imaging optical systems $15_1$ to $16_4$ are not formed. Therefore, in order to observe entire reconstructed image, the observation must be made at a long distance apart from the hologram or by using a field lens 20 shortening the observable distance.

According to the present invention, the above mentioned shortcomings are eliminated by illuminating the component picture with diffuse light beam.

Figure 6:
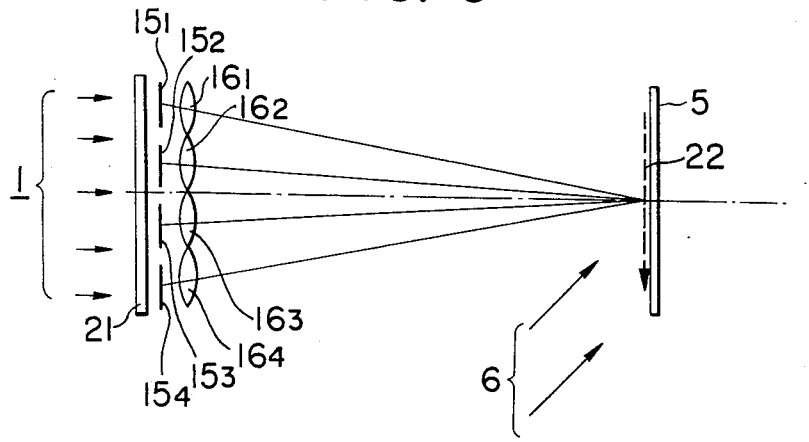
FIG. 6 is a diagram illustrating a method of preparing a synthetic focused image hologram according to the present invention wherein the component picture is illuminated with diffuse light.

FIG. 6 shows one embodiment of a method for making a synthetic focused image hologram of the present invention.

1 is a coherent illuminating beam such as a laser beam, etc., being emitted from the light source which is not shown in the drawing. 21 is a diffusing means such as a diffusing plate etc. The optical arrangement of the component pictures $15_1$ to $15_4$, imaging optical systems $16_1$ to $16_4$ such as imaging lenses, etc., recording medium 5, and a reference beam path 6 is shown in FIG. 5.

Figure 7:
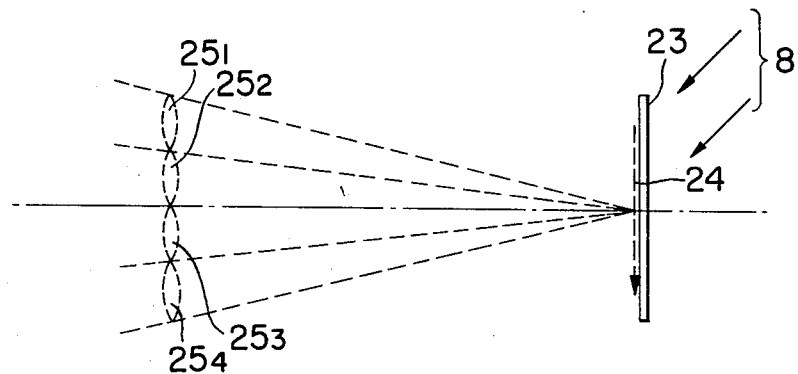
FIG. 7 illustrates a method of reconstruction wherein the hologram prepared by the method of FIG. 6 is reconstructed using the wave front that is conjugate with respect to the wave front of the reference beam used at the time of preparing the hologram.

When each of the component pictures is illuminated with illuminating beam 1 through a diffusing plate 21, the information of any point on the component pictures $15_1$ to $15_4$ will be put into entire pupil area of the imaging optical systems $16_1$ to $16_4$. At this time the imaging optical systems $16_1$ to $16_4$ will be so adjusted that each image 22 is overlapped on the surface of the recording medium 5 or around its vicinity. The forming wave front image 17 is made to interfere with a reference beam 6 and the interference fringes are recorded on the recording medium 5. A synthetic focused image hologram 23 is obtained by proceeding the recording medium. The method to reconstruct images from the hologram 23 thus prepared is shown in FIG. 7. When the synthetic focused image hologram 23 is illuminated with a reconstructing beam 8 having the conjugate wave front with respect to the reference beam 6, reconstructed images 24 are obtained on the plane of the hologram 23 or around its vicinity. At the same time, images $25_1$ to $25_4$ of the pupils of the imaging optical system $16_1$ to $16_4$ are reconstructed. It is possible to observe the whole of each reconstructed image 24 regardless of the observation position as long as it is within the pupil area of the reconstructed images $25_1$ to $25_4$ of the above mentioned imaging optical systems $16_1$ to $16_4$. When the pictures $15_1$ to $15_4$ contain parallax informations, a reconstructed 3-dimensional image can be seen if an observer places his each eye at a different image of pupils.

In such a process for making and reconstructing a synthetic focused image hologram, the position of each component picture must be chosen so that the reconstructed real image is not pseudoscopic.

FIG. 8 shows another method of reconstruction, showing the case when the reconstructing beam 8 is the same as the reference beam 6.

FIG. 8 includes a reconstructed virtual image 26 reconstructed virtual images $27_1$ to $27_4$ of the imaging optical systems $16_1$ to $16_4$. Images $29_1$ to $29_4$ of the reconstructed images $27_1$ to $27_4$ of the imaging optical systems are made using a field lens 28, and the reconstructed image 26 can be observed as this position of the image.

In the method of preparing the synthetic focused image hologram of FIG. 6, an original picture composed of plural number of component pictures having different parallax information is used and each component picture should be imaged by each corresponding imaging system. However, in the method of making a synthetic focused image hologram shown in FIG. 9, an original picture, in which plural member of component pictures are arranged independently under predetermined rule, are overlapped on the hologram recording medium by any one imaging optical system. In FIG. 9, one original picture 30 has the component pictures $31_1$ to $31_6$ arranged independently under a predetermined rule. (This original picture is made by the method shown in FIG. 11). The arrangement of the component pictures $31_1$ to $31_6$ will be determined by the nature of optical matrix device which will be described later. In this drawing, the component pictures $31_1$ to $31_6$ are arranged so that they make two rows and each row consists of three of the same characters.

An imaging optical system 32 is composed of a lens to focus the component pictures $31_1$ to $31_6$ on the hologram recording medium 5 or its vicinity. A composition 33 of prisms $34_1$ to $34_6$, wherein the angle of inclination of each of the prisms $34_1$ to $34_6$ is different from each other two-dimensionally, from left and to right and up and down, for overlaps the component pictures $31_1$ to $31_6$ arranged on the original picture 30 over the recording medium 5. Therefore the arrangement of the component pictures $31_1$ to $31_6$ on the original picture 30 is determined by the angle of inclination of each of the prisms $34_1$ to $34_6$. The composition of the prisms $34_1$ to $34_6$ is hereinafter called an optical matrix device. The picture 30 is illuminated by a coherent beam 1 through a diffusing plate 21. The original picture 30 is imaged by the imaging optical system 32 on the recording medium 5 or at its vicinity. In this case, since the optical matrix device is positioned between the imaging optical system 32 and the recording medium, the wave front containing each component picture on the original picture is overlapped on the recording medium 5. This wave front and the wave front of the reference beam 6 are made to interfere with each other, and the interference fringe is recorded on the recording medium. The recorded medium is the focused hologram 35 shown in FIG. 10. The method of reconstructing this focused hologram is shown in FIG. 10.

When a regenerating beam 8 is irradiated on the hologram 35, the real image 37 of the optical matrix device 33 and the real image 38 of the pupil of the imaging optical system 32 are reconstructed together with the reconstructed real image 36 at the same position as when the hologram was made.

The reconstructed image 36 can be observed through the effective viewing window that is defined by the image 37 of the optical matrix device 33. When the image informations of the original picture are composed of different parallax informations, three dimensional image can be observed by bringing observer's eyes at any two locations of the prism images within the region of the image 37 of the optical matrix device.

Figures 10, 11:
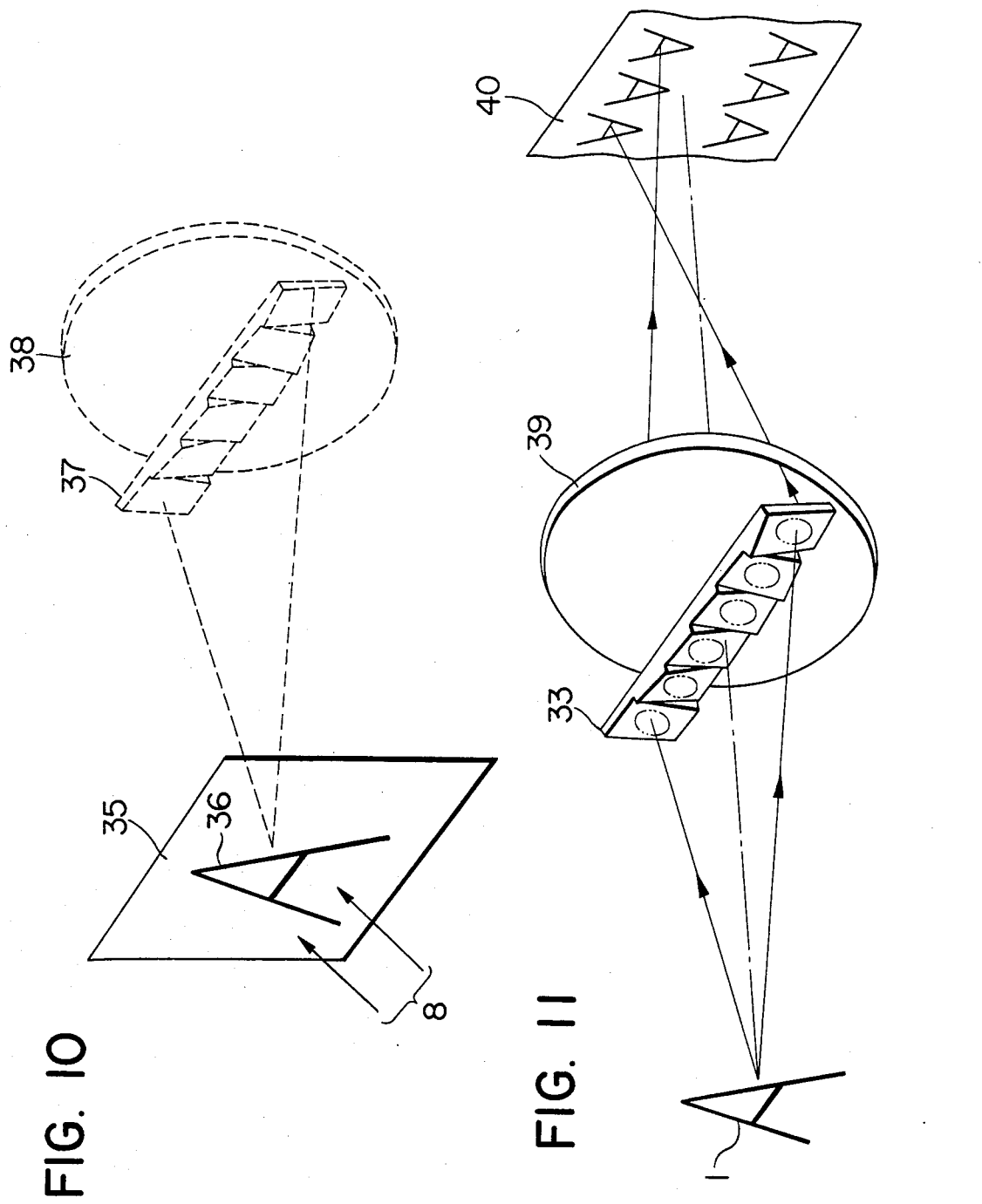
FIG. 10 illustrates a method of reconstructing a synthetic focused image hologram prepared by the method of FIG. 9.
FIG. 11 shows a method of preparing one component picture, as used in the method of preparing a synthetic focused image hologram in FIG. 9, wherein each of different image informations is independently arranged.

FIG. 11 shows a method for making one component picture on which different image informations are independently arranged. The component picture is used in making the hologram of FIG. 9. The image of an object 1 made by an imaging lens 39 is multiple-images by the effect of the optical matrix device 33 which is placed in front of the imaging lens 39.

The component picture is obtained by recording the multiple-images on the film 40. The component picture 30 is obtained by developing this film 40.

What is claimed is:

1. A method of producing and viewing a hologram, comprising the step of arranging adjacent each other in a non-overlapping manner a plurality of separate component pictures having respectively different image information for illumination, the step of illuminating the component pictures with a coherent light source through diffusion means positioned between the component pictures and the coherent light source, the step of forming substantially fully overlapping images of the plurality of component pictures on a hologram recording medium with image-forming optical means, the step of directing a coherent reference beam on the hologram recording medium to obtain a hologram, the step of illuminating the hologram with reconstructing light so that images of the component pictures and an image of the image-forming optical means are reproduced by the reconstructing light, the setp of arranging a plurality of component pictures includes the step of arranging pictures having different parallax information of one object, whereby the images of the component pictures can be viewed at the position of the image of the image-forming optical means.

2. The method as in claim 1, wherein forming overlapping images is accomplished with a plurality of imaging lenses that form the optical means.

3. The method as in claim 1 wherein the step of arranging a plurality of separate component pictures having different parallax information of one object includes arranging these component pictures within the same plane, and wherein the step of forming overlapping images of the plurality of component pictures includes forming these images with a plurality of lenses.

4. The method as in claim 1, wherein the step of arranging a plurality of separate component pictures includes arranging the component pictures within the same plane, and wherein the step of forming overlapping images includes the step of forming these images with image forming optical systems each having a prism for directing light from each picture towards the overlapping images.

5. An apparatus for producing a hologram, comprising a plurality of separate component pictures arranged adjacent each other in a non-overlapping manner and having respectively different parallax data of the same scene, a coherent source means for illuminating the component pictures, diffusion means positioned between the component pictures and the coherent source means, image-forming optical means positioned near said component pictures for forming substantially fully overlapping images of each of the plurality of component pictures so that a holographic recording medium can be placed at the overlapping images, reference beam forming means for forming a coherent reference beam at the overlapping images so that the holographic recording medium can produce a hologram, whereby a reconstructing beam can produce images of the component pictures and an image of the optical means, and whereby the images of the component pictures can be viewed at the position of the image of the image-forming optical means.

6. An apparatus as in claim 5, wherein said component pictures having different parallax data of the same scene are arranged in a single plane, and wherein said image forming optical means include an imaging lens.

7. An apparatus as in claim 5, wherein said component pictures having different parallax data of the same scene are arranged in the same plane and wherein said image forming optical means includes a prism for directing light from each picture toward the overlapping images.

* * * * *